United States Patent [19]

Ohlenforst et al.

[11] Patent Number: 5,120,584
[45] Date of Patent: Jun. 9, 1992

[54] INSULATING GLASS PANE FOR MOTOR VEHICLES

[75] Inventors: Hans Ohlenforst; Dieter Peetz; Hans-Peter Siemonsen, all of Aachen, Fed. Rep. of Germany

[73] Assignee: Saint-Gobain Vitrage, Courbevoie, France

[21] Appl. No.: 625,794

[22] Filed: Dec. 11, 1990

Related U.S. Application Data

[63] Continuation of Ser. No. 238,642, Aug. 30, 1988, abandoned.

[30] Foreign Application Priority Data

Aug. 31, 1987 [DE] Fed. Rep. of Germany ....... 3729036

[51] Int. Cl.⁵ .............................................. E06B 3/24
[52] U.S. Cl. ........................................ 428/34; 52/171; 52/172; 52/788; 52/790; 264/253; 296/96.14
[58] Field of Search .................... 428/34; 52/171, 172, 52/788, 790; 156/107, 109; 296/84.1, 96.14; 264/252, 253, 261, 241

[56] References Cited

U.S. PATENT DOCUMENTS

| 2,885,746 | 5/1959 | Gura | 52/172 |
| 4,576,841 | 3/1986 | Lingemann | 428/34 |
| 4,581,868 | 4/1986 | McCann | 428/34 |
| 4,622,249 | 11/1986 | Bowser | 428/34 |

FOREIGN PATENT DOCUMENTS

2555383B2 6/1976 Fed. Rep. of Germany .
2555384B2 6/1976 Fed. Rep. of Germany .
3517581 9/1986 Fed. Rep. of Germany .

Primary Examiner—Ellis P. Robinson
Assistant Examiner—Donald J. Loney
Attorney, Agent, or Firm—Pennie & Edmonds

[57] ABSTRACT

A motor vehicle pane made from thin insulating glass comprises two thin individual glass panes, which are connected to one another by a spacer frame made from a plastic strand containing a moisture-absorbing means. Along the lower edge area which remains in the door bay, the moisture absorption surface of the plastic strand is enlarged by another plastic strand, which is thinner than the air space between the two panes. Alternatively, the plastic strand can be shaped in a meandering path so as to increase the surface area facing the air space.

13 Claims, 3 Drawing Sheets

1

INSULATING GLASS PANE FOR MOTOR VEHICLES

This is a continuation of application Ser. No. 238,642, filed Aug. 30, 1988, now abandoned.

BACKGROUND OF THE INVENTION

This invention relates generally to insulating glass windows, and more particularly to a window comprising two glass sheets separated slightly from each other and bonded to opposite sides of a moisture-absorbing spacer frame made from a plastic strand. It is particularly useful in a vertically adjustable side window for a motor vehicle.

Insulating glass windows for vehicles are known in the art. See, for example, DE-OS 35 17 581. Insulating glass panes used for this purpose generally consist of two relatively thin individual glass panes each 2 to 3 mm thick. This is to insure that the weight of the insulating glass pane remains within acceptable limitations. In addition, in view of the structural configuration of the vehicle body and the window frame, it is desirable to provide a very thin intermediate air space between the two individual glass panes on the order of 2 to 4 mm. In order to meet this requirement, the spacer frame's cross section must also exhibit this width.

When a very thin air space is desired between the glass panes, it is not possible to produce the spacer frame from a hollow metal section such as that used with insulating glass panes having substantially greater distances between the individual glass panes. This creates a problem since it is desirable to place moisture absorbing material in the intermediate air space and this is ordinarily done by placing such material in the hollow space of the metal spacer frame. Attempts have been made to solve this problem by using a moisture-absorbing plastic strand along the pane circumference that functions as a spacer frame. See, for example, DE 25 55 383 B2 and DE 25 55 384 B2.

However, the moisture-absorbing means in the plastic strand cannot arbitrarily be increased if the plastic strand is to retain its functions as an adhesive that bonds the two glass panes together and as a seal that prevents moisture from penetrating or diffusing into the intermediate air space. At the same time, the cross-sectional width of the bonding strand must be the same as the distance between the two glass panes. Since very thin insulating glass panes require the cross section of the plastic strand forming the spacer frame to be correspondingly small, the total amount of drying agent contained in the plastic strand between very thin insulating panes is also relatively small. Therefore, there is a danger that the life of such insulating glass panes will be limited due to the small amount of drying agent available. This danger is especially great in the case of auto glass panes since they are subjected to varying outside air pressure which increases the diffusion processes through the spacer frame and the sealing compound.

Thus, an auto window is desirable comprising two sheets of glass separated by and bonded to a bonding strand which has an increased moisture-absorbing ability while retaining its required narrow cross-sectional width.

SUMMARY OF THE INVENTION

The object of the invention is to improve an insulating glass pane for motor vehicles by reducing the danger of a premature saturation of the drying agent and thus extending the life of the insulating glass pane.

According to this invention, this objective is achieved by placing plastic strand with an enlarged surface area along at least one part of the pane circumference, preferably along the lower edge of the pane that remains in the door bay.

Advantageously, the enlarged surface area is such that the surface of this plastic strand turned toward the intermediate air space is at least twice as large as the cross sectional area of the intermediate air space. The cross sectional area of the intermediate air space is defined as the product of the interior dimension of the glass pane along the edge in question and the distance between the opposing surfaces of the two glass panes. The distance between the opposing surfaces of the glass panes is referred to as the thickness of the intermediate air space and is typically on the order of 2 to 4 mm.

BRIEF DESCRIPTION OF THE DRAWINGS

These and other objects, features and advantages of the invention will become more readily apparent with reference to the following detailed description of the invention in which like elements are similarly labeled and in which.

DETAILED DESCRIPTION OF THE DRAWINGS

Figure 1:
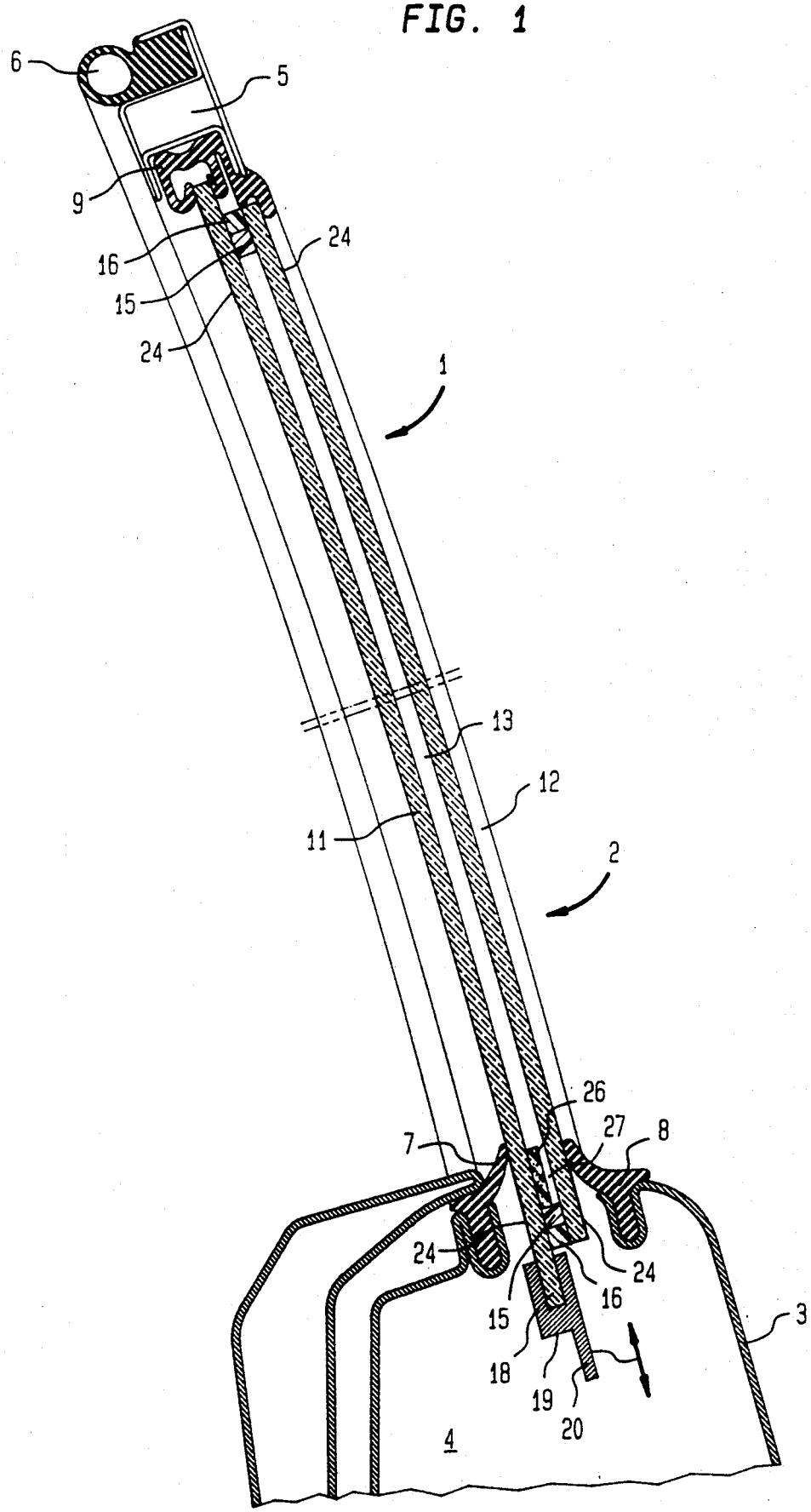
FIG. 1 is a vertical longitudinal sectional view through a vertically adjustable door window.

In FIG. 1, an insulating glass pane 1 is shown installed as a vertically adjustable window in a motor vehicle door 2. Motor vehicle door 2 comprises a lower door body 3, which forms a door bay 4, and a window frame 5 placed above door body 3. A seal 6, placed along window frame 5, seals the window frame from the vehicle body. Seals 7 and 8 placed in door body 3 seal insulating glass pane 1 with door bay 4. A seal 9 on the inside of the window frame 5 seals insulating glass pane 1 with window frame 5.

Insulating glass pane 1 comprises two individual glass panes 11 and 12, which enclose between them an intermediate air space 13. Glass panes 11 and 12 each have a thickness of about 3 mm and consist of prestressed single-pane safety glass. Intermediate air space 13 also has a thickness of about 3 mm. The two glass panes 11 and 12 are bonded on the edge by a double sealing system, i.e., by a plastic strand 15 about 3 mm thick acting as a spacer frame and a sealing adhesive compound 16 placed on the outside of this plastic strand 15. Plastic strand 15 can be made of an elastomer such as butyl rubber containing 10–30%, preferably 20%, of a drying agent. In particular, molecular sieves, i.e., aluminosilicates, are suitable for use as a drying agent. A Thiokol (R) compound, which is a polysulfide elastomer, is advantageously used as the sealing adhesive compound.

As shown in FIG. 1, inside glass pane 11 advantageously has a lower edge 18 that projects beyond outside glass pane 12 so that insulating glass pane 1 exhibits a stepped design on the edge. This stepped edge provides a streamlined arrangement in the window frame.

A metal section 19 is glued to lower projecting edge 18 of glass pane 11. A lifting mechanism for raising and lowering the insulating glass pane engages a flange 20 of metal section 19.

Figure 2:
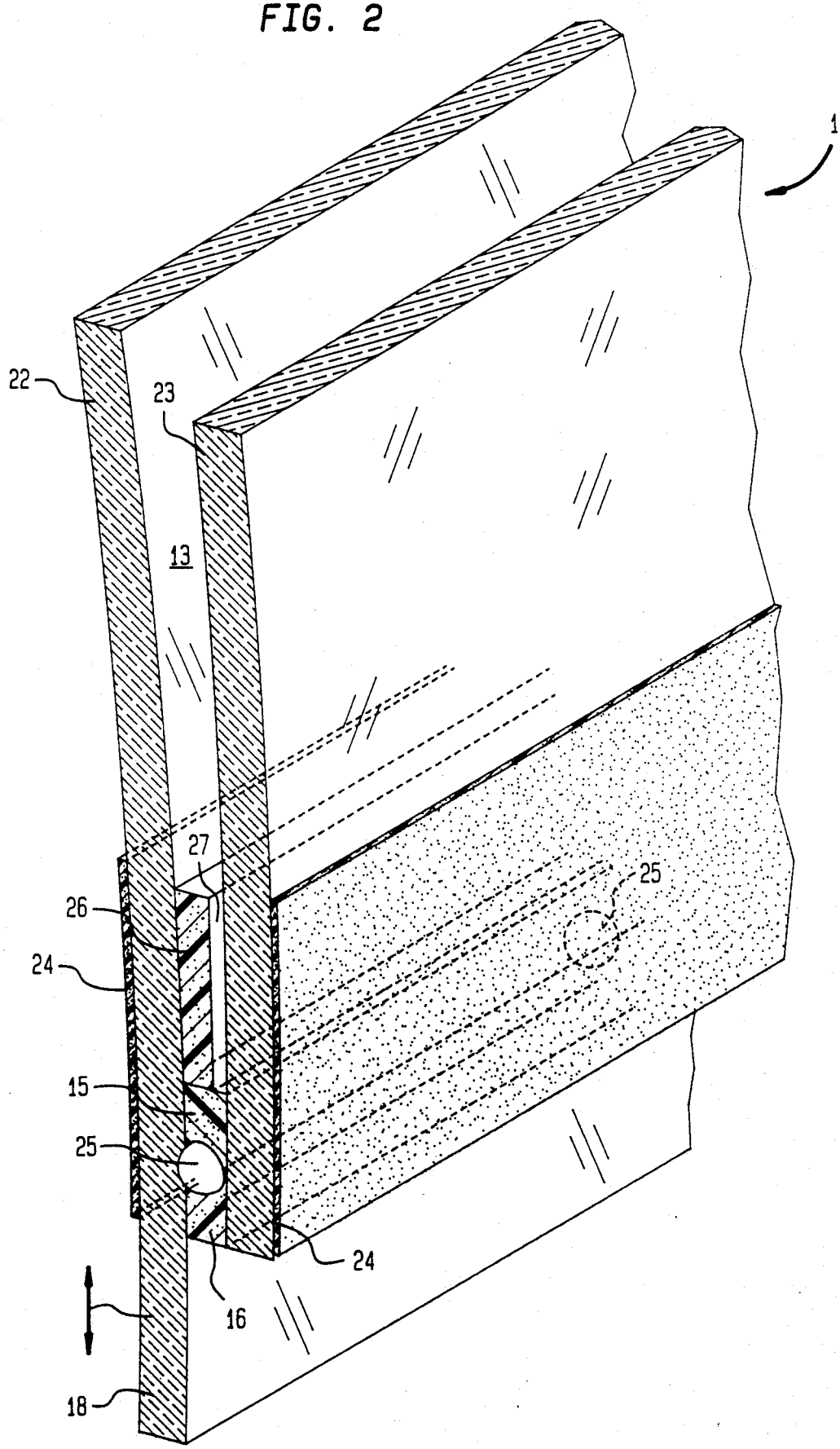
FIG. 2 is a perspective view of an embodiment for the design of the insulating glass pane in the lower edge area according to the invention.

FIG. 2 depicts the lower edge area of pane 1 in a first embodiment of the invention. The two individual glass panes 22 and 23, each about 3 mm thick, form the insulating glass pane, enclosing between them an intermediate air space 13 about 3 mm thick. This results in the cross sectional area of the intermediate air space being equal to 3 mm multiplied by the length of the lower edge of the pane. Each pane is provided on its outside edge with a framelike opaque layer 24 which protects plastic strand 15 and sealing adhesive compound 16 from light and UV rays. Preferably this layer 24 comprises a stoving paint.

As shown in FIG. 2, molded articles 25 of noncompressible material are placed at large intervals in plastic strand 15. These molded articles 25, which can be, for example, balls about 3 mm in diameter, maintain a uniform distance during compression of the insulating glass pane after application of plastic strand 15 to one of the two glass panes.

In accordance with the invention, a strip 26 about 10 mm in height and about 2 mm thick (i.e., thinner than air space 13) is placed on plastic strand 15 on glass pane 22. This strip 26 also comprises a butyl rubber compound, with which a drying agent is mixed. In this case it can be essentially the same compound of which plastic strand 15 is made. However, is also possible to use a plastic compound which contains a larger portion of drying agent than plastic strand 15. Since strip 26 is thinner than the intermediate air space 13 between the two glass panes, an air gap 27 results between strip 26 and glass pane 23. As a result, the surface of strip 26 increases the surface area available for moisture absorption.

Figure 3:
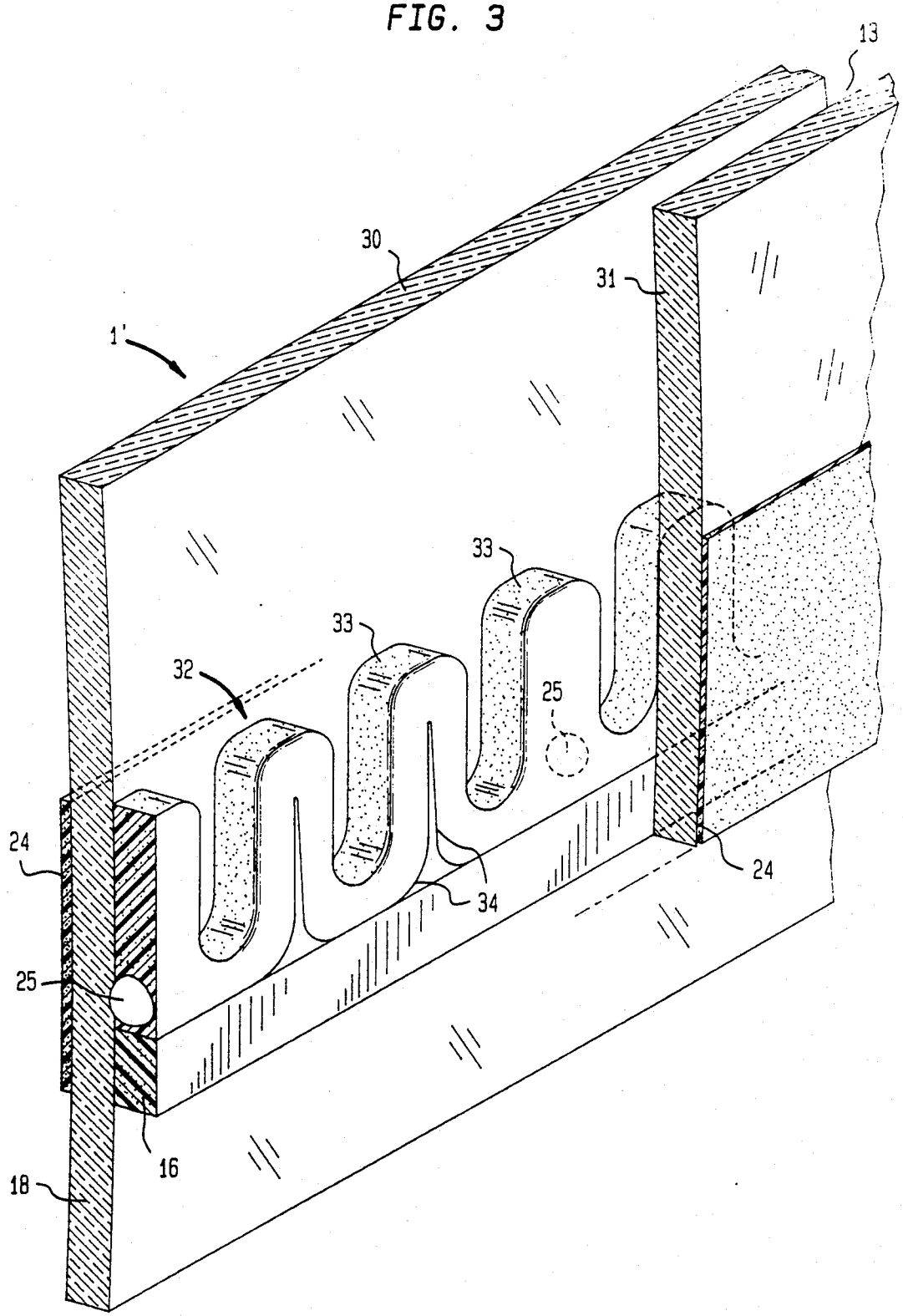
FIG. 3 is a perspective view of a second embodiment of the invention.

In FIG. 3 the two individual glass panes 30, 31 forming insulating glass pane 1' are each coated with a framelike coating 24 of a stoving compound in the area of the edge bonding on the outside of the pane. In this case a plastic strand 32 containing a drying agent is shaped like a toothed strip in which teeth 33 project into intermediate air space 13. The height of these teeth 33 is about 10 mm. Balls 25, made from a noncompressible material are embedded in this toothed strip 32 in order to maintain a constant interval between the two glass panes. A sealing adhesive compound 16, made, for example, of Thiokol, is provided on the outside of the toothed strip.

Toothed strip 32 can be applied on one of the two glass panes as a prefabricated strip. However, the toothed strip can also be applied to the glass pane by using an extruder head to deposit the plastic directly on one of panes 30, 31. In this case, the extruder head is guided along the edge area on a meandering or convoluted path 34 so as to produce a plastic strand having the shape represented in FIG. 3 or some other shape which greatly increases the surface area of the strand that is exposed to the interior air space 13.

What is claimed is:

1. In an insulated glass window comprising first and second glass sheets and a strand separating and bonding a marginal portion of said sheets so as to define an intermediate air space between said sheets, a moisture-absorbing means contained in the strand and positioned along at least a part of said marginal portion so that on the moisture-absorbing means the surface area exposed to the intermediate air space is at least twice as large as the cross-sectional area of the intermediate air space between the glass sheets, said cross sectional area being measured perpendicularly to said glass sheets and along said part of said marginal portion.

2. The insulated glass window of claim 1 wherein the moisture absorbing means comprises an inserted plastic strip which is thinner than the intermediate air space between the insulating glass sheets so that there is an air gap between said plastic strip and one of the said sheets that communicates with said intermediate air space.

3. The insulated glass window of claim 1 wherein said moisture-absorbing means is provided along a lower edge marginal portion of said window.

4. The insulated glass window of claim 1 wherein said strand comprises molded articles to maintain a uniform distance between first and second glass sheets.

5. In an insulated glass window comprising first and second glass sheets, an intermediate air space therebetween, and a strand separating and bonding a marginal portion of said sheets, a moisture-absorbing means located in the air space between the first and second glass sheets comprising an elongated plastic strip which is thinner than the intermediate air space and forms an air gap between said plastic strip and one of said sheets that communicates with the intermediate air space whereby on the moisture-absorbing means the surface area exposed to the intermediate air space is at least twice as large as the cross-sectional area of the intermediate air space between the glass sheets, said cross sectional area being measured perpendicularly to said glass sheets and along the length of the elongated plastic strip.

6. The insulated glass window of claim 5 wherein the strand containing the moisture-absorbing means at least partially forms a spacer frame and includes portions which project into said intermediate air space.

7. The insulated glass window of claim 5 wherein said strand is formed by extruding a plastic strand onto one of the glass sheets in a meandering path.

8. The insulated glass window of claim 5 wherein said strand comprises a first component for bonding to the glass sheets and a second component for absorbing moisture which may be present in said intermediate air space.

9. The insulated glass window of claim 5 wherein said moisture-absorbing means is provided along a lower edge marginal portion of said window.

10. The insulated glass window of claim 5 wherein said moisture-absorbing means is provided along a lower edge marginal portion of said window.

11. An insulated glass window comprising first and second glass sheets and a strand separating and bonding a marginal portion of said sheets so as to define an intermediate air space between said sheets, said strand comprising a moisture-absorbing material that is extruded onto one of the glass sheets along at least a part of said marginal portion in a convoluted path with portions of said strand projecting into the intermediate air space whereby on the strand the surface area exposed to the intermediate air space is at least twice as large as the cross sectional area of the intermediate air space between the glass sheets, said cross sectional area being measured perpendicularly to said glass sheets and along said part of said marginal portion.

12. The insulated glass window of claim 11 wherein the strand further comprises an inserted plastic strip, which is thinner than the intermediate air space of the insulating glass sheets and forms an air gap between the strip and one of the sheets allowing the entry of air of said intermediate air space.

13. The insulated glass window of claim 12 wherein said strip is provided along a lower edge marginal portion of said window.

* * * * *